(12) United States Patent
Volkert et al.

(10) Patent No.: US 11,559,068 B2
(45) Date of Patent: Jan. 24, 2023

(54) CONCENTRATED ORANGE CARROT PERMEATES

(71) Applicant: GNT GROUP B.V., Mierlo (NL)

(72) Inventors: Marcus Volkert, Mierlo (NL); Anke Kiesslich, Mierlo (NL); Hendrik Hoeck, Mierlo (NL)

(73) Assignee: GNT GROUP B.V., Mierlo (NL)

( * ) Notice: Subject to any disclaimer, the term of this patent is extended or adjusted under 35 U.S.C. 154(b) by 852 days.

(21) Appl. No.: 16/348,977

(22) PCT Filed: Nov. 8, 2017

(86) PCT No.: PCT/EP2017/078616
§ 371 (c)(1),
(2) Date: May 10, 2019

(87) PCT Pub. No.: WO2018/087152
PCT Pub. Date: May 17, 2018

(65) Prior Publication Data
US 2019/0289881 A1    Sep. 26, 2019

(30) Foreign Application Priority Data

Nov. 10, 2016  (EP) .................... 16198185

(51) Int. Cl.
*A23L 27/10*     (2016.01)
*A23L 5/43*      (2016.01)
*A23L 2/08*      (2006.01)
*A23L 2/385*     (2006.01)

(52) U.S. Cl.
CPC .............. *A23L 2/087* (2013.01); *A23L 2/385* (2013.01); *A23L 5/43* (2016.08); *A23L 27/10* (2016.08); *A23V 2002/00* (2013.01)

(58) Field of Classification Search
CPC . A23L 2/087; A23L 2/385; A23L 5/43; A23L 27/10
See application file for complete search history.

(56) References Cited

U.S. PATENT DOCUMENTS

| 3,787,589 A | 1/1974 | Stephens et al. |
| 5,213,826 A * | 5/1993 | Miller .................... A23K 10/28 426/492 |
| 5,403,613 A | 4/1995 | Furui et al. |
| 5,756,141 A * | 5/1998 | Chen .................... A23L 2/74 210/651 |
| 6,340,489 B1 | 1/2002 | Suzuki et al. |
| 7,815,961 B2 * | 10/2010 | Westhoff ................. A23L 2/087 426/616 |
| 2009/0317536 A1 | 12/2009 | Cambeen et al. |
| 2013/0259987 A1 | 10/2013 | Mavroudis et al. |
| 2015/0017308 A1 | 1/2015 | Schopp et al. |

FOREIGN PATENT DOCUMENTS

| WO | WO-8604059 A1 * | 7/1986 |
| WO | 2012038386 A1 | 3/2012 |

OTHER PUBLICATIONS

Cassano, A., Drioli, E., Galaverna, G., Marchelli, R., DiSilvestro, G., Cagnasso, P. (2003) "Clarification and concentration of citrus and carrot juices by integrated membrane processes." J. Food Eng. vol. 57, pp. 153-163.*
Modernist Cuisine. Caramelized Carrot Soup. 2012. Downloaded Feb. 10, 2022, from https://modernistcuisine.com/recipes/caramelized-carrot-soup-no-centrifuge-necessary/.*
Anonymous, How to make caramel/syrup/honey with one ingredient (sugar free, vegan), Nov. 16, 2012, url: http://www.greenthickies.com/how-to-make-caramel-syrup-honey-sugar-free-vegan/, retrieved Nov. 29, 2016 XP055324336.
Diqiao S. Wei et al.. Separation of Polyphenolics and Sugar by Ultrafiltration: Effects of Operating Conditions on Fouling and Diafiltration, International Journal of Biological, Biomolecular, Agricultural, Food and Biotechnological Engineering, 2007, pp. 115-122, vol. 1, No. 10 World Academy of Science, Engineering and Technology.

* cited by examiner

*Primary Examiner* — Nikki H. Dees
(74) *Attorney, Agent, or Firm* — Hudak, Shunk & Farine Co., LPA

(57) ABSTRACT

A concentrated orange carrot permeate, wherein a) the amount of fructose is 2.5 to 30.0 wt. % on a dry matter basis, b) the amount of glucose is 3.0 to 20.0 wt. % on a dry matter basis, c) the amount of sucrose is 0.5 to 60.0 wt. % on a dry matter basis, and d) the dry matter is 55 to 85 wt. %, wherein the amounts of fructose and glucose are determined according to ASU L 31.00-12, wherein the amount of sucrose is determined according to ASU L 31.00-13, and wherein the dry matter is determined according to ASU L 26.11.03-1a. A caramelized concentrated orange carrot permeate, a mix of the concentrated orange carrot permeate and the caramelized concentrated orange carrot permeate, to the use of said products in food applications and to food products containing concentrated orange carrot permeate and/or caramelized concentrated orange carrot permeate.

1 Claim, No Drawings

CONCENTRATED ORANGE CARROT PERMEATES

FIELD OF THE INVENTION

The invention is directed to orange carrot permeates.

BACKGROUND OF THE INVENTION

Orange carrots (*Daucus carota* L.) are grown worldwide and are popular for their orange color and the healthy ingredients like carotenoids.

The orange color also made the carrots popular as a source for carrot juice. Carrot juice is also used for coloring food and as a healthy ingredient in food with a high level of carotenoids, especially β-carotene (provitamin A).

Several processes for the production of carrot juice are known. These processes are, for example, described in U.S. Pat. Nos. 3,787,589, 5,403,613 and 6,340,489. U.S. Pat. No. 3,787,589 describes that raw carrots are cooked in an acidic aqueous solution prior to juice extraction.

U.S. Pat. No. 5,403,613 describes that carrots are crushed or chopped while the carrots are sprayed with citric acid or lemon juice, optionally in combination with ethyl alcohol and salt water. Thereafter the crushed or chopped carrots are heated and the carrot juice is squeezed out in a twin-screw extruder.

U.S. Pat. No. 6,340,489 describes that the carrots are peeled and blanched in water with a temperature of 70 to 80° C. Thereafter, citric acid is applied to the blanched carrots and the blanched carrots are crushed and squeezed to obtain the carrot juice.

It is also known to make a color concentrate by ultrafiltration of the carrot juice. The retentate, obtained during ultrafiltration, is used as the color concentrate, while the permeate is not used. The permeate is the composition that has passed through the membrane used for ultrafiltration. The orange carrot permeate as such is not very usable since it is very diluted, has no or little color, has a low amount of solids dissolved in water (<10° Brix), contains nearly no carotenoids and fibers and is not safe from a microbiological point of view. The orange carrot permeate is seen as a waste product.

SUMMARY OF THE INVENTION

The inventors have found new applications for orange carrot permeates, which enhance the usability of carrots and makes ultrafiltration of orange carrot juice economically more viable.

The orange carrot permeates can be used as feedstock for new concentrated products, which can have different applications.

DETAILED DESCRIPTION OF THE INVENTION

The invention relates to concentrated orange carrot permeates, wherein a) the amount of fructose is 2.5 to 30.0 wt. % on a dry matter basis, b) the amount of glucose is 3.0 to 20.0 wt. % on a dry matter basis, c) the amount of sucrose is 0.5 to 60.0 wt. % on a dry matter basis, and d) the dry matter is 55 to 85.0 wt. %, wherein the amounts of fructose and glucose are determined according to ASU L 31.00-12, wherein the amount of sucrose is determined according to ASU L 31.00-13 and wherein the dry matter is determined according to ASU L 26.11.03-1a.

The weight percentages of components like fructose, glucose and sucrose are determined relative to the total dry weight of the concentrated orange carrot permeate (the dry matter basis). The dry weight of the orange carrot permeate is determined by drying the concentrated orange carrot permeate and removing the water from the permeate. The removal of water can be performed by heating the permeate, for example under vacuum at a temperature between 30 and 75 celc, till no weight loss occurs. When the dry matter of the permeate is 60 wt %, the permeate will contain 40 wt. % of water.

The concentrated orange carrot permeate according to the invention has the advantage that the amount of water is low, the amount of sugars is high, the ratio of sucrose to fructose and glucose is high. Additionally, the orange carrot permeate has preferably a very low carotenoid content, a high mineral content and a high glutamic acid content.

The low carotenoid content has the effect that the concentrated orange carrot permeate is almost colorless. This has the advantage, that the concentrated orange carrot permeate can be used as an ingredient for food, without providing an inevitable orange color to the food. Addition to food can therefore been conducted independent from the provision of a color to the food.

The high mineral content and high glutamic acid content are believed to contribute to a rich taste, which makes the concentrated orange carrot permeate an excellent ingredient for savory food applications.

The dry matter in the concentrated orange carrot permeate is 55 to 85.0 wt. %. The dry matter can vary depending on the concentration method and the intended use of the concentrated orange carrot permeate. The dry matter preferably is 60 to 83.0 wt. %, more preferably 65.0 to 80.0 wt. %.

The concentrated orange carrot permeate comprises 2.5 to 30.0 wt. % of fructose on a dry matter basis, preferably 3-25 wt. %, more preferably 4-20 wt. %.

The concentrated orange carrot permeate comprises 3 to 20 wt. % of glucose on a dry matter basis, preferably 4-15 wt. %, more preferably 5-11 wt. %.

The concentrated orange carrot permeate comprises 0.5-60 wt. % of sucrose on a dry matter basis, preferably 2-50 wt. %.

The titratable acidity determined according to IFU no. 3 of the concentrated orange carrot permeate preferably is 3.5-10 wt. % on a dry matter basis, more preferably 4-9 wt. %.

The dietary fiber content determined according to ASU L 00-00-18 of the concentrated orange carrot permeate preferably is below 10 wt. % on a dry matter basis, more preferably 0.1-8 wt. %, most preferably 0.2-4 wt. %. The content of dietary fiber preferably is as low as possible to prevent precipitation and haze formation in the concentrated orange carrot permeate.

The amount of sodium determined according to DIN EN 15510 of the concentrated orange carrot permeate preferably is 0.05 to 1.5 wt. % on a dry matter basis, more preferably 0.1-1 wt. %, most preferably 0.15-0.6 wt. %.

The amount of glutamic acid preferably ranges between 0.8 and 4 wt. % on dry matter basis, more preferably between 1.5 and 3 wt. %. Glutamic acid is determined according to an accredited SGS Fresenius method (see experimental section).

The amount of sodium and glutamic acid of the concentrated orange carrot permeate according to the invention is a factor of 5-15 higher than the amount of these components in for example an apple juice concentrate.

Therefore the taste of the concentrated orange carrot permeate according to the invention is much richer compared to the taste of apple juice concentrate, which makes the composition according to the invention very suitable for use in savory applications.

The orange carrot is a cheap raw material. As carrots are vegetables, they are more readily available for their short growth cycle, compared to many fruits, e.g. apple.

The concentrated orange carrot permeate according to the present invention can replace several well-known taste and color additives known in the art. Many of these compounds are classified as additives and fall under the commission regulation (EU) No. 231/2012. They may contain chemical additives to enhance taste or color, and therefore be not entirely natural and provide a potential health risk. Alternatives like concentrated apple juice do not have a high mineral content, nor high glutamic acid concentrations and a different balance of sugar ingredients.

In a preferred embodiment the concentrated orange carrot permeate has a composition wherein
  a) the amount of fructose is 3-25 wt. %,
  b) the amount of glucose is 4-15 wt. %,
  c) the amount of sucrose is 2-50 wt. %,
  d) the dry matter is 60 to 80 wt. %,
  e) the glutamic acid content is between 1.5-3 wt. %,
wherein the dry matter content is relative to the total of the composition, and wherein the amounts of fructose, glucose, sucrose and glutamic acid are relative to the dry matter content of the composition.

A concentrated orange carrot permeate can be heated, in the absence of water, for a certain amount of time. This heat treatment (also known as caramelization) enhances the color of the concentrated orange carrot permeate and changes the properties of the permeate. A concentrated orange carrot permeate that is heat treated is here and hereafter defined as a caramelized concentrated orange carrot permeate. This caramelized product has unique properties that opens a number of new applications, for example as replacement of a caramelized apple juice concentrate, a malt extract just as a replacement of burnt sugars or caramel colors in food products.

The caramelized concentrated orange carrot permeate has a brown color. After the heat treatment the amount and type of sugars may have changed relative to the concentrated orange carrot permeate: the amount of fructose in the caramelized concentrated orange carrot permeate will be higher and the amount of sucrose will be lower than the respective amounts in the concentrated orange carrot permeate.

The invention also relates to a caramelized concentrated orange carrot permeate.

A caramelized concentrated orange carrot permeate preferably has a composition wherein
  a) the amount of fructose is 10 to 25 wt. % on a dry matter basis,
  b) the amount of glucose is 5 to 15 wt. % on a dry matter basis,
  c) the amount of sucrose is 0.5-25 wt. % on a dry matter basis, and
  d) the dry matter is 55 to 85 wt. %.

The dry matter can vary depending on the intended use of the caramelized concentrated orange carrot permeate. The dry matter preferably is 60-83 wt. %, more preferably 65-80 wt. %.

The caramelized concentrated orange carrot permeate preferably comprises 12-22 wt. % of fructose on a dry matter basis, more preferably 13-20 wt. %.

The caramelized concentrated orange carrot permeate preferably comprises 6-12 wt. % of glucose on a dry matter basis.

The caramelized concentrated orange carrot permeate preferably comprises 1-20 wt. % of sucrose on a dry matter basis.

The titratable acidity determined according to IFU no. 3 of the caramelized concentrated orange carrot permeate preferably is 4.0 to 10 wt. % on a dry matter basis, more preferably 5-9 wt. %.

The dietary fiber content determined according to ASU L 00-00-18 of the caramelized concentrated orange carrot permeate preferably is 0.1 to 10.0 wt. % on a dry matter basis.

The amount of sodium determined according to DIN EN 15510 of the caramelized orange carrot permeate preferably is 0.1 to 1.5 wt. % on a dry matter basis, more preferably 0.2 to 1 wt. %, most preferably 0.25 to 0.75 wt. %.

The amount of glutamic acid ranges between 1 and 3 wt. % on a dry matter basis.

Preferably, the color intensity of the caramelized concentrated orange carrot permeate is higher than 300, more preferably higher than 400, determined according to GNT color measurement method. Preferably, the color intensity is below 900, more preferably below 850.

The color intensity is measured according to a method described in the experimental section.

During the caramelization step, a colored composition is obtained. It is possible to mix this colored composition with other sugar containing compositions, for example with the concentrated orange carrot permeate. By mixing the caramelized composition, a mixed composition can be obtained with a defined color strength, which can be used in the enrichment of food products.

The invention also relates to a mix of a caramelized concentrated orange carrot permeate and a concentrated orange carrot permeate. This mixed composition will comprise fructose, glucose, sucrose, glutamic acid and shows color, wherein
  a) the amount of fructose is 4-15 wt. % on a dry matter basis,
  b) the amount of glucose is 5-10 wt. % on a dry matter basis,
  c) the amount of sucrose is 20-60 wt. % on a dry matter basis, and
  d) the dry matter is 55 to 85 wt. %,
  e) the amount of glutamic acid ranges between 1-3 wt. % on a dry matter basis and
  f) the color intensity ranges between 450 and 600,
wherein the amounts of fructose and glucose are determined according to ASU L 31.00-12, the amount of sucrose is determined according to ASU L 31.00-13, and the amount of glutamic acid according to an accredited SGS Fresenius method.

Process

A concentrated orange carrot permeate can be obtained according to a process comprising the following steps:
  a) providing orange carrots,
  b) mashing the orange carrots and mix the mashed carrots with water and acid to form a carrot mixture 1,
  c) heating carrot mixture 1 to a temperature above 60° C. to obtain carrot mixture 2,
  d) mashing carrot mixture 2 for a second time to obtain carrot mixture 3, e) separating carrot mixture 3 in a solid fraction 3 with an average particle size above 50 µm and a liquid 3, f) treating liquid 3 with enzymes, g) ultrafiltrating liquid 3 to obtain permeate A and retentate A, and h) concentrating the permeate A to 55-80 wt. % dry matter to obtain a concentrated orange carrot permeate.

The orange carrots can be provided in washed and/or peeled form.

Mashing can, for example, be performed in a hammer mill, a comminutor, a press or a homogenizer.

The mashed carrots are mixed with water and an acid. Examples of acids are tartaric acid, citric acid, fumaric acid and malic acid, also lemon juice (concentrate) can be used. Preferably, citric acid is used.

Mixing of the carrot mixture can be performed in a mixer known in the art. Examples of suitable mixers are a reactor wherein the carrot mixture is mixed with a stirrer, a blender, a static mixer, a disperser, and an extruder.

Heating of the carrot mixture is performed at a temperature above 60° C., preferably above 65° C., more preferably above 70° C. Preferably, the temperature is below 100° C., more preferably below 95° C., most preferably below 90° C. Heating can be performed in one step or in more steps.

After heating the carrot mixture is mashed for a second time. Mashing for the second time can, for example, be performed in a press or a homogenizer.

Thereafter, the carrot mixture is separated in a solid fraction and a liquid. Separation can, for example, be performed by pressing, filtering, centrifugation or sieving the carrot mixture. Preferably, separation is performed by sieving, more preferably by sieving with a mesh size of below 200 µm.

After separation a solid fraction and a liquid are obtained. The liquid is treated with enzymes. Examples of suitable enzymes are cellulase, hemicellulase, α-amilase, β-amilase, pectinase, pectin esterase and peroxidase.

After the enzyme treatment the liquid is ultrafiltrated with typical membrane pore size 2.000 to 20.000 Dalton. The resulting permeate is pasteurized at 100° C., more preferable at 95° C. The permeate is then concentrated to 60.0 to 80.0 wt. % dry matter, preferably to 62.0 to 78.0 wt. % dry matter, more preferably to 65.0 to 75.0 wt. % dry matter.

Concentration can, for example, be performed by evaporation or vacuum evaporation.

A caramelized concentrated orange carrot permeate can, for example, be obtained by evaporating almost all the water from a concentrated orange carrot permeate and thereafter heating the obtained product.

A caramelized concentrated orange carrot permeate can be obtained from a concentrated orange carrot permeate as described above according to a process comprising the following steps:

a) heating a concentrated orange carrot permeate at a temperature between 100 and 118° C., optionally in the presence of an oil, to obtain a product A having a water content below 6 wt. %, b) heating product A to a temperature between 110 and 140° C. for a sufficient time to obtain a caramelized product A c) add 5.0 to 25.0 wt. % water to the caramelized product A to stop caramelization, cooling the product and optionally filtering the product to obtain a caramelized concentrated orange carrot permeate.

Heating of the concentrated orange carrot permeate to remove water can be performed in the presence of an oil. The oil acts as an anti-foaming agent. Examples of suitable oils are sunflower oil, olive oil, canola oil and maize germ oil.

A product A is obtained with a water content below 6 wt %, preferably below 5 wt %, more preferably below 4.5 wt. %, relative to the total weight of product A.

Heating of product A to produce caramelized product A is performed at a temperature between 110 and 140° C., for a time sufficient to obtain the right color value. Typically the caramelization time ranges between a few minutes to several hours.

To stop further caramelization 5.0 to 25.0 wt. % water is added to the caramelization mixture, the mixture is cooled and optionally filtered to remove insoluble products and the caramelized concentrated orange carrot permeate is obtained.

The color intensity of the caramelized concentrated orange carrot permeate is typically above 100, preferably above 300, more preferably above 400. The color of the caramelized concentrated orange carrot preferably is below 900, preferably below 850, more preferably below 800.

Use

The concentrated orange carrot permeate, the caramelized concentrated orange carrot permeate product and the mix of the two, can be used as ingredients in food; in particular in savory products, desserts, confectionery and dairy products.

The invention also relates to food products comprising a concentrated orange carrot permeate.

The invention further relates to a food product comprising a caramelized concentrated orange carrot permeate.

The invention also relates to a food product comprising a mix of a concentrated orange carrot permeate and a caramelized concentrated orange carrot permeate.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Examples

Several samples of a concentrated orange carrot permeate (COCP) were made with the following process:

Fresh carrots were mashed and mixed with water under the addition of citric acid solution (50 vol %). The mix was heated in two steps to 69 and 80° C., respectively. After heating the mash was shredded again and the solid fraction (>50 μm) was separated from the liquid phase (e.g. decanter, sieve). The juice was cooled and enzymatically treated (e.g. proteolytic and pectolytic enzymes). The treated juice was ultra-filtrated. The permeate of the filtration step was pasteurized and concentrated (evaporated) to 60.0 to 80.0 wt. % dry matter. The resulting product (COCP) was stored frozen or chilled.

Several samples of a caramelized concentrated orange carrot permeate (CCOCP) were made with the following process:

Concentrated orange carrot permeate (COPC) was heated to maximum 118° C. in a batch cooker under atmospheric pressure. During this process the water content was reduced to <6.0 wt. %. At approximately 105° C., sunflower oil (<0.05 wt. % relative to the total weight of the COPC) was added to reduce foaming. Color evolution was frequently checked according to GNT color measurement method. When the target color was reached, approximately 10.0 wt. % water was added to stop caramelization. Dry matter is adjusted by addition of 5.0 to 20.0 wt. % water. The product was then filtered (80-100 μm) and cooled below 50° C. The final product (CCOCP) was stored at ambient or chilled conditions.

Several parameters of various samples of the COCP and the CCOCP were determined and the results are given in Table 1 below. As a comparative product the same properties were determined for a caramelized apple juice concentrate (CAJC) and a malt extract (ME).

In Table A the parameters are defined as listed here below:

| Parameter | Method | Modification |
|---|---|---|
| Dietary fiber | ASU L 00.00-18 (1997-01), mod., enzymatical-gravimetrical | Includes protein determination using the DUMAS method instead of Kjeldahl; fat is removed from the sample with special solvent mixtures. "Examination of foods; determination of dietary fiber in foods" |
| Titratable acidity | IFU No. 3 | No modifications |
| D-Glucose | ASU L 31.00-12 (1997-01) | Equal to DIN EN 1140 - spectrophotometrically determination of NADPH "Fruit and vegetable juices - Enzymatic determination of D-glucose and D-fructose content - NADPH spectrometric method; German version EN 1140:1994" |
| D-Fructose | ASU L 31.00-12 (1997-01) | Equal to DIN EN 1140 - spectrophotometrically determination of NADPH "Fruit and vegetable juices - Enzymatic determination of D-glucose and D-fructose content - NADPH spectrometric method; German version EN 1140:1994" |
| Sucrose | ASU L 31.00-13 (1997-09) | Equal to DIN EN 12146 - spectrophotometrically determination of NADPH "Fruit and vegetable juices - Enzymatic determination of sucrose content - NADP spectrometric method; German version EN 12146:1996" |
| Sodium | DIN EN 15510 (2007-10) mod., ICP/OES | Modified fusion: use of nitric acid at 250° C. "Animal feeding stuffs - Determination of calcium, sodium, phosphorus, magnesium, potassium, iron, zinc, copper, manganese, cobalt, molybdenum, arsenic, lead and cadmium by ICP-AES; German version EN 15510:2007" |
| Color intensity | GNT Color measurement method | Sample is diluted 1:1000 in two steps: the basic solution 1:100 is prepared using demineralized water (5 g product in 495 g demin. water), the test solution 1:1000 is prepared using 5 g of the basic solution dissolved in 45 g of buffer solution with pH 7.0 (phosphate buffer). Absorption measurement is performed using the UV-VIS spectrophotometer Lambda 25 (Perkin Elmer, Massachusetts, USA) in the visible spectral region. The test solution is measured in disposable cuvettes with 1 cm path length (Brand GmbH & Co KG, Wertheim, Germany). The absorption is determined at 420 nm. The color intensity is calculated as follows: absorption at 420 nm substracted by the absorption at 750 nm and multiplied with the dilution factor (1000). |
| Dry matter | ASU L 26.11.03-1a (1983-05) | Vacuum at 70° C. |
| Glutamic acid | Accredited SGS Fresenius method | Derivatization of amino acids (glutamic acid) with 6-aminoqinolyl-N-hydroxysuccinimidyl carbamate and thereafter determination with LC-MS/MS using the ESI+ mode. For the quantification, an external calibration curve is used. Results are verified with external standards. Includes free and bound glutamic acid. |

TABLE 1

| Name | color intensity (GNT method) | titratable acidity (as citric acid) [% in DM] | dietary fiber [% in DM] | fructose-D [% in DM] | glucose-D [% in DM] | sucrose [% in DM] | sum glucose/ fructose/ sucrose [% in DM) | sodium [% in DM] | glutamic acid [% in DM] | dry matter (DM) (70° C. vakuum) [g/100 g] | ratio glu/ fru |
|---|---|---|---|---|---|---|---|---|---|---|---|
| COCP | 5 | 5.33 | 1.42 | 5.94 | 6.5 | 50.59 | 63.05 | 0.7113 | 2.13 | 68.99 | 1.10 |
| COCP | 5 | 5.34 | 1.05 | 5.91 | 6.6 | 47.60 | 60.15 | 0.6938 | | 69.33 | 1.12 |
| COCP | 5 | 5.02 | 1.08 | 6.35 | 6.9 | 50.52 | 63.82 | 0.7224 | | 67.69 | 1.09 |
| COCP | 5 | 5.95 | 1.47 | 8.45 | 9.2 | 47.81 | 65.45 | 0.4679 | 2.90 | 68.60 | 1.09 |
| COCP | 5 | 5.35 | 0.88 | 6.28 | 7.2 | 51.15 | 64.59 | 0.4516 | 1.77 | 68.43 | 1.14 |
| COCP | 5 | 4.62 | 1.25 | 4.78 | 8.0 | 55.19 | 67.93 | 0.3575 | | 69.04 | 1.67 |
| caramelized COCP | 383 | 7.04 | 1.95 | 13.40 | 6.8 | 20.72 | 40.88 | 0.7706 | | 72.41 | 0.51 |
| caramelized COCP | 351 | 7.31 | 1.89 | 13.38 | 6.9 | 22.35 | 42.63 | 0.7656 | | 72.49 | 0.52 |
| caramelized COCP | 540 | 7.85 | 3.03 | 19.79 | 10.9 | 6.51 | 37.23 | 0.5805 | | 72.25 | 0.55 |
| caramelized COCP | 598 | 8.13 | 3.75 | 18.47 | 11.0 | 5.64 | 35.11 | 0.6310 | | 70.93 | 0.60 |
| caramelized COCP | 738 | 8.44 | 8.36 | 19.43 | 10.6 | 2.00 | 32.00 | 0.4671 | 2.00 | 69.99 | 0.54 |
| caramelized COCP | 714 | 8.35 | 8.86 | 18.59 | 10.3 | 1.97 | 30.85 | 0.4525 | | 71.00 | 0.55 |
| Caramelized Apple Concentrate (Nigay) | 534 | 3.92 | 4.34 | 20.31 | 17.93 | 0.17 | 38.40 | 0.0471 | <0.1 | 71.40 | 0.88 |
| Malt extract (Harboe) | 409 | 2.31 | 20.15 | 1.83 | 10.26 | 0.45 | 12.54 | 0.1037 | | 53.60 | 5.61 |

What is claimed is:

1. A mixed composition comprising a concentrated orange carrot permeate and a caramelized concentrated orange carrot permeate, wherein the concentrated orange carrot permeate comprises fructose, glucose, and sucrose, wherein
    a. the amount of fructose is 2.5 to 30.0 wt. % on a dry matter basis,
    b. the amount of glucose is 3.0 to 20.0 wt. % on a dry matter basis,
    c. the amount of sucrose is 0.5 to 60.0 wt. % on a dry matter basis, and
    d. the dry matter is 55 to 85 wt. % based on the weight of the concentrated orange carrot permeate,
wherein the caramelized concentrated orange carrot permeate comprises fructose, glucose, and sucrose, wherein
    e. the amount of fructose is 10 to 25 wt. % on a dry matter basis,
    f. the amount of glucose is 5 to 15 wt. % on a dry matter basis,
    g. the amount of sucrose is 0.5 to 25 wt. % on a dry matter basis, and
    h. the dry matter is 55 to 85 wt. % based on the weight of the caramelized concentrated orange carrot permeate,
wherein this mixed composition comprises fructose, glucose, sucrose, and glutamic acid, wherein
    i. the amount of fructose is 4 to 15 wt. % on a dry matter basis,
    j. the amount of glucose is 5 to 10 wt. % on a dry matter basis,
    k. the amount of sucrose is 20 to 60.0 wt. % on a dry matter basis,
    l. the amount of glutamic acid ranges between 1-3 wt. % on a dry matter basis, and
    m. the dry matter is 55 to 85 wt. %, based on the weight of the mixed composition, wherein the mixed composition shows a color having a color intensity ranging between 450 and 600,
wherein the amounts of fructose and glucose are determined according to ASU L 31.00-12, the amount of sucrose is determined according to ASU L 31.00-13, the dry matter is determined according to ASU L 26.11.03-1 and the amount of glutamic acid is determined according to an accredited SGS Fresenius method.

* * * * *